(12) United States Patent
Kelaher et al.

(10) Patent No.: US 10,309,421 B2
(45) Date of Patent: Jun. 4, 2019

(54) FAN NOISE REDUCTION USING AN ADAPTIVE HELMHOLTZ CHAMBER

(71) Applicant: Lenovo Enterprise Solutions (Singapore) Pte. Ltd., Singapore (SG)

(72) Inventors: Daniel P. Kelaher, Holly Springs, NC (US); Kevin Perveiler, Wake Forest, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 510 days.

(21) Appl. No.: 15/041,698

(22) Filed: Feb. 11, 2016

(65) Prior Publication Data

US 2017/0234330 A1 Aug. 17, 2017

(51) Int. Cl.
| | |
|---|---|
| *F04D 29/66* | (2006.01) |
| *F04D 19/00* | (2006.01) |
| *F04D 29/54* | (2006.01) |
| *F04D 27/00* | (2006.01) |
| *F04D 29/52* | (2006.01) |

(52) U.S. Cl.
CPC ......... *F04D 29/665* (2013.01); *F04D 19/002* (2013.01); *F04D 27/004* (2013.01); *F04D 29/522* (2013.01); *F04D 29/545* (2013.01)

(58) Field of Classification Search
CPC .............................. F04D 29/663; F04D 29/665
See application file for complete search history.

(56) References Cited

U.S. PATENT DOCUMENTS

| | | | |
|---|---|---|---|
| 5,000,079 A * | 3/1991 | Mardis ................. | F04D 29/663 361/695 |
| 5,267,842 A * | 12/1993 | Harmsen ............. | F04D 25/0606 417/354 |
| 8,814,501 B2 * | 8/2014 | Shoji ................... | F04D 25/0613 415/119 |

OTHER PUBLICATIONS

Wikipedia "EDDY Current Brake", https://en.wikipedia.org/wiki/Eddy_current_brake, Nov. 16, 2015, 5 pages.
Creative Commons Attribution—ShareALike License "Engineering Acoustics/Noise from Cooling Fans", Dec. 14, 2013, 7 pages.
Wikipedia—Creative Commons Attribution—ShareALike License "Helmholtz Resonance", Dec. 6, 2015, 5 pages.
Myonghyon Han, "Sound reduction by a Helmholtz resonator", Lehigh University—Lehigh Preserve, Theses and Dissertations, http://preserve.lehigh.edu/etd, Sep. 2008, 110 pages.
Chris Woodford, "How to Measure Speed", Nov. 4, 2014, 8 pages.
(Continued)

*Primary Examiner* — Woody A Lee, Jr.
*Assistant Examiner* — Jason A Fountain
(74) *Attorney, Agent, or Firm* — Jeffrey L. Streets

(57) ABSTRACT

A fan assembly includes a fan having an outlet side, a fan duct positioned at the fan outlet side, and a hollow cylindrical chamber positioned within the fan duct, wherein the chamber has two closed ends, a cylindrical side wall, and an inlet port. The dimensions of the chamber are determined to suppress one or more noise frequencies emitted by the fan. In one example, one or more dimensions of a chamber disposed in an outlet duct of an axial fan is automatically adjusted to suppress a noise frequency that is a function of a rotational speed of the axial fan.

22 Claims, 5 Drawing Sheets

(56) References Cited

OTHER PUBLICATIONS

Koai, et al., "The Muffling Effect of Helmholtz Resonator Attachments to a Gas Flow Path", Purdue University—Purdue e-Pubs, International Compressor Engineering Conference—School of Mechanical Engineering, Paper 1201, http://docs.lib.purdue.edu/icec/1201, 1996, 7 pages. (This document only identifies the year of publication (without the month), but the year of publication is sufficiently earlier than the effective U.S. filing date and any foreign priority date so that the particular month of publication is not in issue. See MPEP 609.04(a)).
Greenheck Fan Corp., "Vane Axial Application and Design" greenheck.com, May 2010, pp. 1-20.
A. Santana, Jr., et al., "Acoustic Cavities Design Procedures", Thermal Engineering, vol. 6—No. 02, Dec. 2007, pp. 27-33.

\* cited by examiner

FAN NOISE REDUCTION USING AN ADAPTIVE HELMHOLTZ CHAMBER

BACKGROUND

Field of the Invention

The present invention relates to fans, fan assemblies, and apparatus for suppressing noise produced by fans.

Background of the Related Art

Computer systems typically include a number of electronic components disposed within a chassis. These components generate heat as a byproduct of electrical power consumption, and require a cooling system to prevent the components from becoming damaged. A common cooling system includes one or more fans for driving airflow through the chassis across the electronic components. For example, a personal computer (PC) or server may include one or more onboard fans provided inside the chassis of the PC or server. In larger computer systems, such as in a rack-mounted computer system, a shared blower module having multiple fans may be provided in a chassis for cooling multiple servers mounted in the chassis. For larger computer systems, such as in a datacenter, a more comprehensive cooling system may include a dedicated computer room air conditioning (CRAC) system and a particular arrangement of racks that includes alternating hot and cold aisles.

The large, high-speed fans and blower modules used for cooling servers and other information technology equipment are the primary source of noise in the datacenter. A datacenter includes many densely-packaged rack-mounted servers and corresponding fans. The combined noise of the many fans and blower modules in a datacenter produce an undesirable level of noise. Unfortunately, limiting or reducing the amount of airflow through the computer system can require a reduction in processor load, causing the computer to run at less than its full processing capacity.

In order to allow such large computer systems to operate at full processing capacity or performance, the data center may be physically separated from office spaces in order to isolate the noise and reduce discomfort experienced by employees. There may also be need for a general policy that noise levels must be reduced below certain user-defined limits whenever an administrator or other person must enter into the data center. Even with stand-alone computers, it would be desirable to reduce noise causes by fans.

BRIEF SUMMARY

One embodiment of the present invention provides an apparatus comprising a fan having an outlet side, a fan duct positioned at the fan outlet side, and a hollow cylindrical chamber positioned within the fan duct, wherein the chamber has two closed ends, a cylindrical side wall, and an inlet port.

Another embodiment of the present invention provides a method comprising automatically adjusting one or more dimensions of a Helmholtz chamber disposed in an outlet duct of an axial fan to suppress a noise frequency that is a function of a rotational speed of the axial fan.

DETAILED DESCRIPTION

Figure 1A:
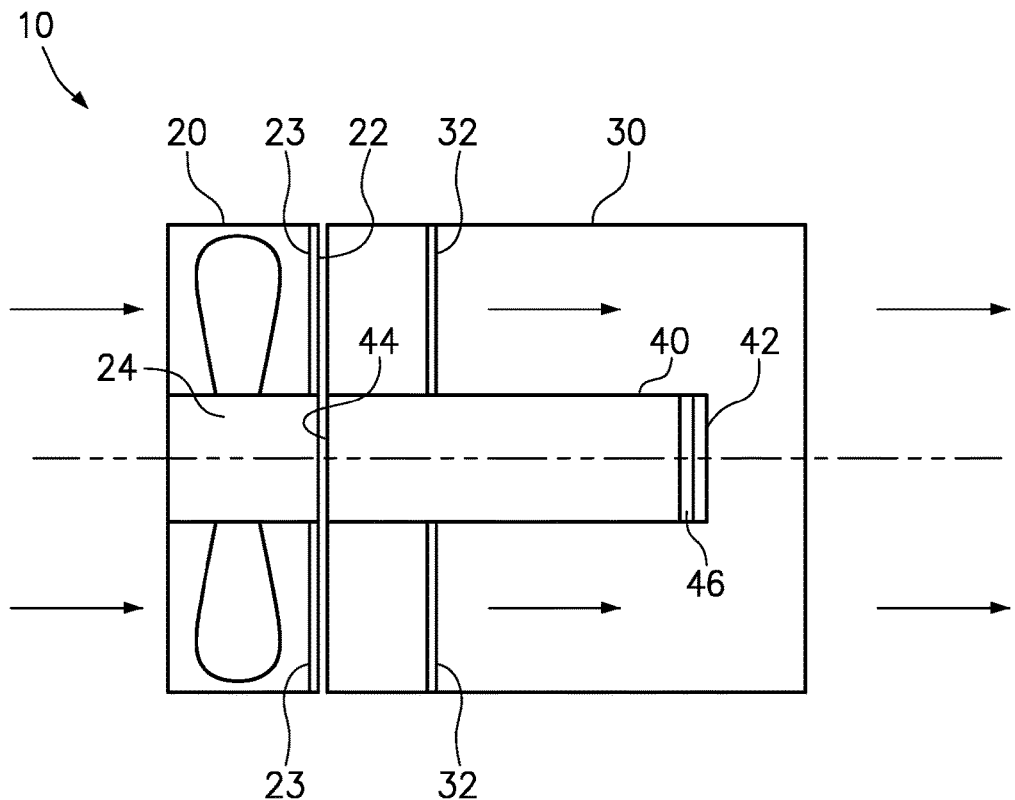
FIG. 1A is a schematic side view of a fan assembly including a fan with a duct and a hollow cylindrical chamber positioned at the outlet side of the fan.

One embodiment of the present invention provides an apparatus comprising a fan having an outlet side, a fan duct positioned at the fan outlet side, and a hollow cylindrical chamber positioned within the fan duct, wherein the chamber has two closed ends, a cylindrical side wall, and an inlet port. The inlet port is preferably formed in the cylindrical side wall adjacent to a distal end of the chamber, and may be formed by a series of open slots or an open ring.

In certain embodiments of the invention, the fan is an axial fan having a fan hub, and the cylindrical chamber is axially aligned with the fan hub. Preferably, the cylindrical chamber may have an outer diameter matching a diameter of the fan hub. Where the fan duct has an inner diameter matching the diameter of the fan outlet side, the assembly forms an annular air passage between the chamber and the duct.

While the hollow cylindrical chamber may have fixed dimensions to suppress a fixed noise frequency, various embodiments of the chamber may have one or more dimension that is varied in response to a change in fan rotational speed. Preferably, the one or more dimension of the chamber may be varied to an extent that is predetermined to cause suppression of a rotational speed-dependent noise frequency. For example, the inlet port in the chamber may have a width that is automatically varied in response to a change in fan rotational speed. Such dimensional variability may be beneficial whether the fan is a fixed speed fan or a variable speed fan, since even changes in air pressure or advancing fan age may result in an unintended variation in the rotational speed of the fan.

Embodiments of the invention may include a metal pickup formed at a proximal end of the chamber. Either the fan motor within the fan hub or one or more magnets secured to the fan hub adjacent the metal pickup will, during rotation of the fan hub, induce angular displacement of the metal pickup about an axis of the fan. This angular displacement is believed to be caused by electrical eddy currents formed within the adjacent metal pickup. It should be emphasized that although the fan rotates (i.e., spins) at a given rotational speed, the metal pickup is merely angularly displaced (i.e., turned about its axis to an angular amount). For example, at a given rotational speed of the fan, the metal pickup will turn to a certain angle and remain at that angle until the rotational speed of the fan changes (i.e., either an increase or decrease in the rotational speed of the fan). Optionally, the angular displacement of the metal pickup can be mechanically limited over the fan's known range of rotational speeds, such as less than 180 degrees. Angular displacement of the metal pickup may be used to cause a variation in one or more dimension of the chamber and, therefore, to vary the noise frequency that will be suppressed. Optionally, the one or more variable dimension of the chamber is selected from chamber length, inlet port width (port area), and inlet port passage length (port length).

Embodiments of the invention may include a fixed bearing that secures the metal pickup in axial alignment with the axial fan and allows the metal pickup to rotate within the bearing. However, the bearing should prevent longitudinal movement of the metal pickup (i.e., prevent movement in a direction along the axis of the fan). A spring may bias the metal pickup to a default angular orientation.

In a further embodiment, a hollow cylindrical chamber that has one or more variable dimension may include a proximal chamber portion and a distal chamber portion, with the two chamber portions having a seal between them to maintain chamber integrity that allows the chambers to move longitudinally relative to each other while maintaining this seal. The proximal chamber portion may be coupled to, or integral with, the metal pickup, and may be supported by a fixed bearing that allows the proximal chamber portion to rotate in place while maintaining axial alignment with the axial fan, and includes a spiral groove. Furthermore, the distal chamber portion may be concentric with the proximal chamber portion and may include a pin received in a spiral groove of the proximal chamber portion such that rotation of the proximal chamber portion causes longitudinal movement of the distal chamber portion relative to the proximal chamber portion. Since the amount of angular displacement of the metal pickup and proximal chamber portion is a function of the rotational speed of the fan, and since the amount of longitudinal movement of the distal chamber portion is determined by both the slope of the spiral groove and the amount angular displacement of the proximal chamber portion, the relative longitudinal position of the proximal and distal chamber portions has a fixed relation to the rotational speed of the fan. Accordingly, changes in fan rotational speed that cause a change in a predominant noise frequency will automatically induce a change in the hollow cylindrical chamber so that the new predominant noise frequency is still suppressed.

In a still further embodiment, the chamber may further include an intermediate chamber portion including a pin received in a second spiral groove of the proximal chamber such that rotation of the proximal chamber portion further causes longitudinal movement of the intermediate chamber portion relative to the proximal chamber portion. For example, rotation of the proximal chamber portion in a first direction may cause longitudinal movement of the intermediate chamber portion to extend a length of the chamber and may cause longitudinal movement of the distal chamber portion to increase a width of the inlet port (port area) and decrease the length of the inlet port passage (port length). It should be appreciated that the slopes of the first and second spiral grooves may be independently selected to cause longitudinal movement of the distal and intermediate chamber portions at rates determined to suppress a rotational speed-dependent noise frequency.

Another embodiment of the present invention provides a method comprising automatically adjusting one or more dimensions of a Helmholtz chamber disposed in an outlet duct of an axial fan to suppress a noise frequency that is a function of a rotational speed of the axial fan. Optionally, eddy currents induced by rotation of the axial fan are used to drive the adjustments in the one or more dimensions of the Helmholtz chamber as a function of a rotational speed of the axial fan.

The hollow cylindrical chambers are used to suppress one or more prevalent fan noise frequency. The hollow cylindrical chamber may be referred to as a Helmholtz chamber. Such chamber may be tuned to suppress the most prevalent fan noise frequency spikes, which are measured as a function of fan rotational speed (i.e., rotations-per-minute (RPMs) or a blade pass frequency (BPF), wherein BPF is stated in units of Hertz (HZ) and is equal to the number of fan blades multiplied by the rotations-per-minute (RPM) divided by 60 seconds/minute).

Embodiments of the present invention may be adapted for use in smaller system enclosures, potentially utilizing existing open volume areas in an enclosure that have the necessary size and location. Alternatively, embodiments may be installed external to a given system, such as on the outlet of an exhaust fan. While various embodiments of the present invention have been described in terms of a computer chassis fan, it should be recognized that axial fans in any other application or operating environment may also benefit from the noise suppression provided.

Assemblies for securing the fan duct in position adjacent a fan outlet may provide mechanical isolation or dampening between the fan enclosure, the fan duct and/or a computer enclosure. Optionally, the fan duct may have an inner surface that is contoured or lined with sound absorbing material to provide additional noise suppression. For example, the contour or sound absorbing material may specifically target high-frequency noise that is not dependent on the fan RPM. Furthermore, the fan duct may be fabricated using a material that is flexible (rigid, yet compliant) to reduce the amount of vibration transmitted from the fan to the computer enclosure.

Embodiments of the present invention may be adapted to various applications. In applications involving a non-axial fan, such as a centrifugal fan, a Helmholtz chamber and surrounding fan duct may be positioned downstream of an outlet side of the fan housing. In applications requiring suppression of multiple noise frequencies, the fan assembly may include multiple chambers placed in series. Accordingly, one or more dimension of each of the multiple chambers may be controlled by a common mechanism, such as a single rotating pickup sleeve with multiple spiral grooves to control one or more dimension of each chamber. In other applications, multiple frequencies that are harmonic in nature may be suppressed by a single chamber having multiple inlet ports, with each port position and area tuned to a different harmonic frequency.

FIG. 1A is a schematic side view of a fan assembly 10 including a fan 20 with a fan duct 30 and a hollow cylindrical chamber 40 positioned at the outlet side 22 of the fan 20. The direction of airflow is indicated with arrows. In the embodiment shown, the fan duct 30 has an inner diameter that matches the diameter of the opening in the outlet side of the fan, and the fan duct 30 has sufficient length to extend past a distal end 42 the chamber 40. This embodiment also illustrates a proximal end 44 of the hollow cylindrical chamber 40 immediately adjacent a fan hub 24 of the fan and the hollow cylindrical chamber 40 having an outer diameter that matches the diameter of the fan hub 24. Optionally, the chamber 40 may be secured to the fan duct 30 by narrow radial struts 32 that position the chamber 40 in the axial center of the fan duct 30 in axial alignment with the fan hub 24. These struts 32 should be in alignment with and in close proximity to struts 23 that support the fan hub 24 in fan 20 to reduce air turbulence and noise. Accordingly, the inside of the fan duct 30 and the outside of the chamber 40 form an annular passage for airflow from the outlet side of the axial fan 20. The fan duct 30, itself, may be secured to the fan housing, optionally with vibration dampening material there between. In further options, the fan duct may have an inner surface that is contoured or lined with sound absorbing material to provide additional noise suppression.

The hollow cylindrical chamber 40 has an inlet port 46 near the distal end 42 of the chamber. The inlet port 46 allows airflow through the annular airflow passage to be in fluid communication with the interior of the hollow cylindrical chamber 40 via an inlet port passage leading from the inlet port 46 to the interior of the chamber 40. This passage is formed by the volume between the entry point of inlet port 46 and where the passage terminates in chamber 40. Optionally, a flange can be added to distal end 42 extending into chamber 40, where inlet passage volume would be the area between the inner wall of chamber 40 and the outer wall of the flange added to distal end 42, with flange length being adjusted to provide the required inlet passage volume characteristics. While there is no net airflow into or out of the chamber, the air pressure fluctuations associated with one or more noise frequencies are suppressed. The volume inside the chamber 40, the position and area of the inlet port 46, and the inlet port passage length (volume) are important in determining which noise frequency or frequencies will be suppressed. Accordingly, noise from a given fan may be measured and a prevalent noise frequency may be determined. The chamber 40 may be designed with an appropriate volume, inlet port area, and inlet port passage volume to suppress the prevalent noise frequency.

Figure 1B:
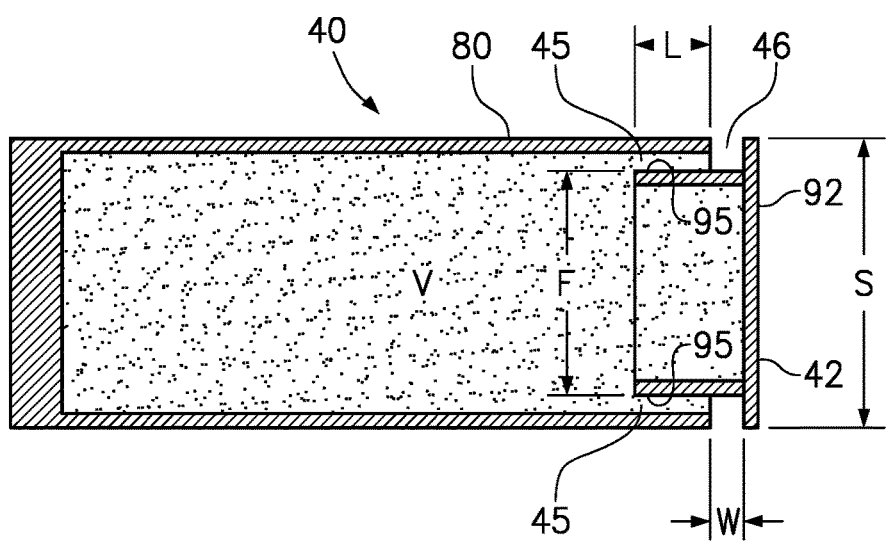
FIG. 1B is a schematic diagram of a hollow cylindrical chamber, illustrating various physical dimensions.

FIG. 1B is a schematic diagram of a hollow cylindrical chamber 40, illustrating various physical dimensions of the chamber. The chamber 40 has a cylindrical (circumferential) inlet port 46 formed by the opening between a cylindrical member 80 and an end cap 92. The inlet port 46 has an inlet port area determined by the formula πSW. The chamber also has an annular inlet port passage 45 formed between the cylindrical member 80 and an extension flange 95. Accordingly, the volume of the annular inlet port passage 45 may be determined by the formula $L*[\pi(0.5\ S)^2 - \pi(0.5\ F)^2]$.

For a Helmholtz chamber having any given diameter (S), the width (W) of the opening determines an inlet port area. Accordingly, the inlet port area may be varied by adjusting the width (W) of the opening so that a targeted noise frequency may be suppressed, with similar effect obtained by adjusting the inlet port passage length (L) to change the inlet passage volume. The relationship between Helmholtz chamber resonant frequency and the dimensions of the Helmholtz chamber having a circular inlet port and a cylindrical inlet port passage are believed to follow the following mathematical relationship:

$$f = c/2\pi \sqrt{(S/VL)}$$

where: f is the Helmholtz chamber resonant frequency;
c is the speed of sound in air (temperature dependent);
S is the diameter of the inlet port leading to the Helmholtz chamber, determining port area;
V is the internal volume of the Helmholtz chamber; and
L is the length of the inlet port passage leading to the Helmholtz chamber, determining the passage volume.

While the foregoing equation is a standard formula for determining Helmholtz chamber resonant frequency that is based on a circular inlet port and cylindrical inlet port passage, it is believed that the equation is applicable to a chamber having a circular slot and an annular inlet port passage by calculating equivalent circular and cylindrical values for the inlet port and inlet port passage. For example, where the circular slot has an inlet port area that is calculated using the formula πSW, it is possible to calculate an effective diameter for a circular inlet port having the same total area. This effective area may be used in the foregoing equation. Similarly, the annular inlet port passage volume may be determined, and then calculate an inlet port passage length for a cylindrical inlet port having the same passage volume. This effective length may be used in the foregoing equation.

Figure 2:
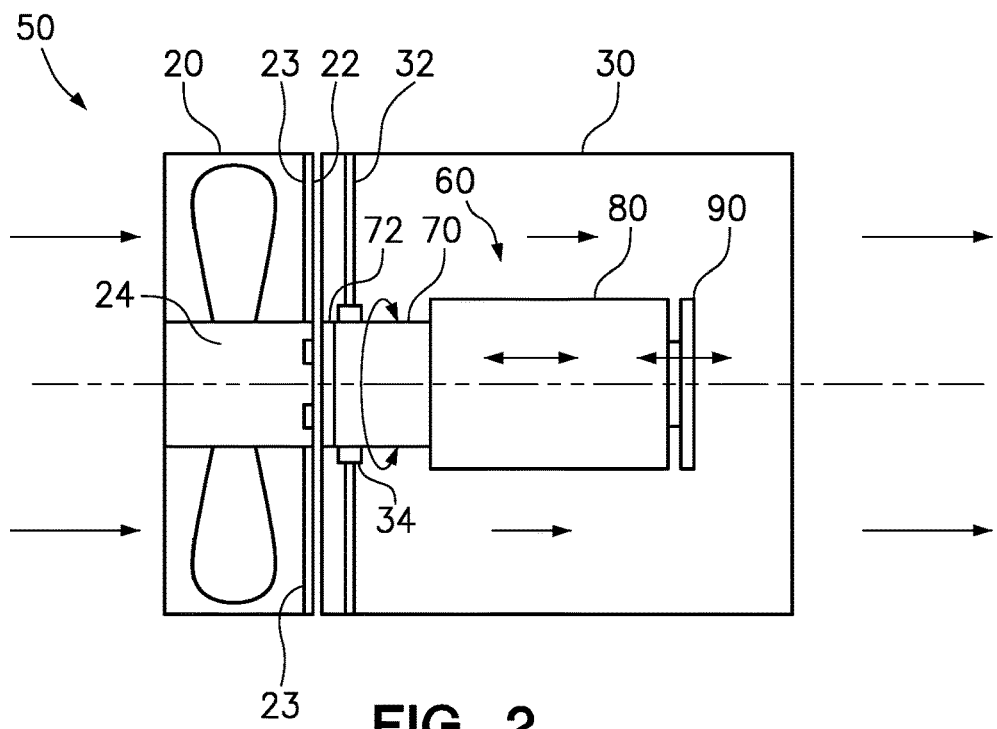
FIG. 2 is a schematic side view of a fan assembly including a fan with a duct and a hollow cylindrical chamber having one or more adjustable dimension positioned at the outlet side of the fan.

FIG. 2 is a schematic side view of a fan assembly 50 including a fan 20 with a fan duct 30 and a hollow cylindrical chamber 60 having one or more adjustable dimension positioned at the outlet side 22 of the fan 20. Some of the components in FIG. 2 are given the same reference numbers as like components in FIG. 1.

The hollow cylindrical chamber 60 is similar to the chamber 40 of FIG. 1 in that they both have a diameter matching the diameter of the fan hub 24 and are positioned in the axial center of the fan duct 30. However, the hollow cylindrical chamber 60 has two adjustable dimensions, namely chamber length (and, therefore, chamber volume) and inlet port width/passage length (and, therefore, inlet port area and passage volume). While these adjustments will be discussed in more detail with respect to the remaining drawing Figures, the chamber 60 includes a proximal chamber portion 70, an intermediate chamber portion 80 and a distal chamber portion 90. The proximal chamber portion 70 includes a metal pickup 72 and is secured for rotation in place by a circumferential bearing 34 that is secured in a fixed position by the narrow radial struts 32 that are aligned with and in close proximity to the struts 23 supporting the fan hub 24. The intermediate chamber portion 80 and the distal chamber portion 90 are prevented from rotating, but are allowed to move longitudinally (as indicated by the small bidirectional arrows). However, the fan duct 30 extends beyond an outlet side 22 of the fan 20 by a sufficient in distance to encompass the chamber 60 in its most extended condition. Example mechanisms for controlling movement of the chamber portions are illustrated in the following drawing Figures.

Figure 3:
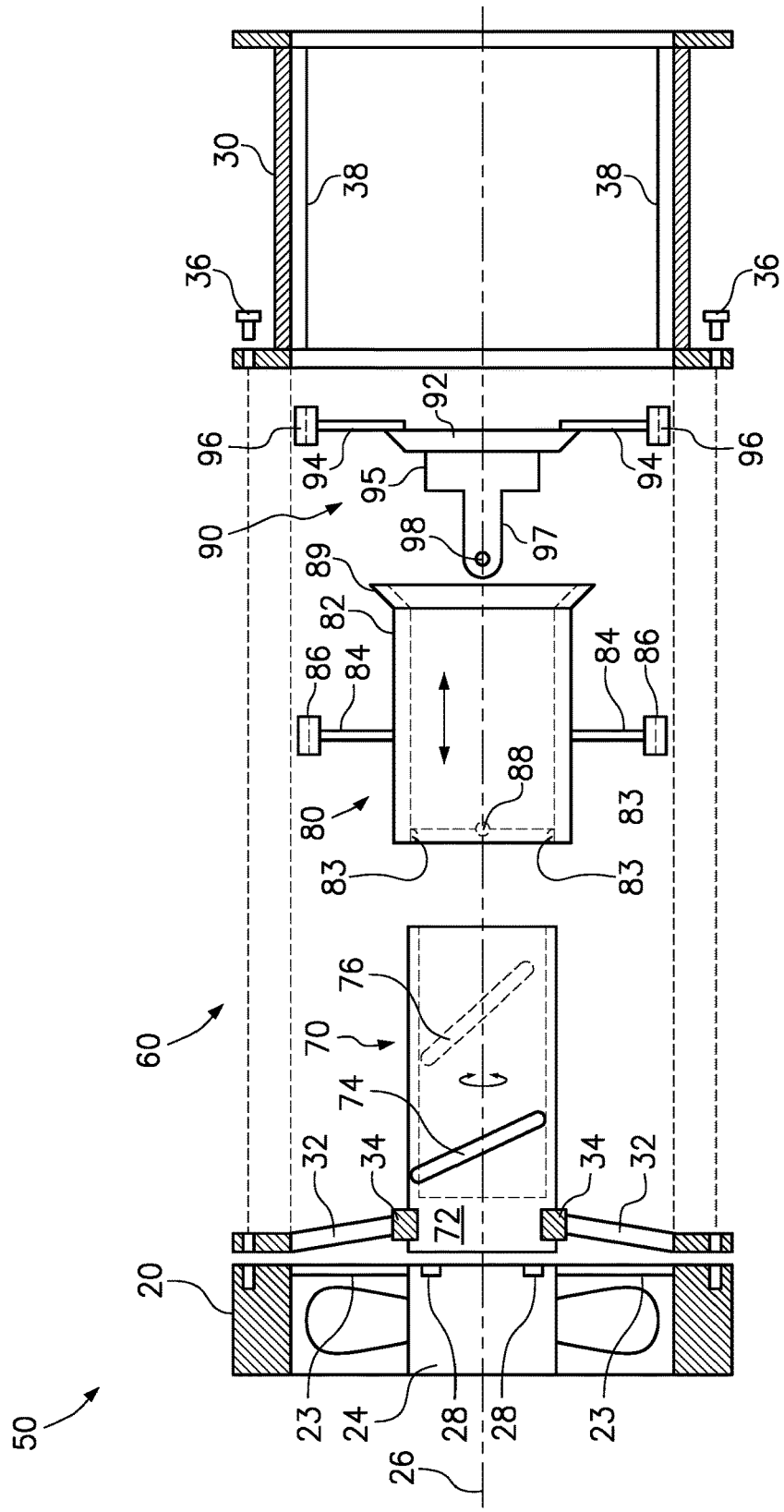
FIG. 3 is an exploded schematic view of the fan assembly of FIG. 2.

FIG. 3 is an exploded schematic view of the fan assembly 50 of FIG. 2. The fan 20 establishes an axial centerline 26 about which the other components are aligned. The fan duct 30 may be secured to a housing of the fan 20 with screws 36. Optionally, the radial struts 32 that position the rotational bearing 34 may be secured between the fan 20 and the fan duct 30. Accordingly, the rotational bearing 34 allows the metal pickup 72 and the proximal chamber portion 70 to rotate in place without any longitudinal movement. The proximal chamber portion 70 includes a first spiral groove 74 cut into an outer surface and a second spiral groove 76 cut into an inner surface. In the example shown, the second spiral groove 76 has a greater pitch or angle than the first spiral groove 74.

The intermediate chamber portion 80 includes a cylindrical body 82 that is open at both ends. A pair of radial struts 84 extend from the body 82 and terminate in slide bearings 86 that allow the body 82 to move longitudinally while preventing the body 82 from rotating about the central axis 26. These struts preferably align with the struts that support the fan hub 24 and the chamber support struts 32. Optionally, each slide bearing 86 has a radially directed V-shaped groove (shown in FIG. 4) that is received about a V-shaped channel 38 formed on the inside surface of the fan duct 30. The intermediate chamber portion 80 further includes an inwardly directed pin 88 that is received in the first spiral groove 74, and a circumferential seal 83 that forms an air-tight seal between the intermediate and proximal chamber portions.

The distal chamber portion 90 forms a closed end cap 92 with an optional extension flange 95 that creates an inlet port passage when inserted in body 82. A pair of radial struts 94 extend from the end cap 92 and terminate in slide bearings 96 that allow the end cap 92 to move longitudinally while preventing the end cap 92 from rotating about the central axis 26. These struts 94 should also align with the struts 23 that support the fan hub 24 and the chamber support struts 32. The distal chamber portion 90 further includes a longitudinally extending arm 97 supporting an outwardly directed pin 98 that is received in the second spiral groove 76.

The metal pickup 72 uses electrical eddy-currents to translate the RPM of the fan 20 into a specific angular displacement of the proximal chamber portion 70 about the central axis 26 of the fan 20. Optionally, the metal pickup 72 may be angularly displaced by an eddy current field that is emitted by a fan motor in the fan hub 24 or emitted by one or more magnets 28 secured to the fan hub 24 to create the RPM-based eddy-current field. In either configuration, an eddy-current field results in angular displacement (rotation in place) of the metal pickup 72 that is connected to the proximal chamber portion 70. The metal pickup 72 and proximal chamber portion 70 may rotate inside the fixed bearing 34. Accordingly, the angular displacement of the proximal chamber portion 70 is a function of the fan RPM and drives a mechanism that varies one or more dimension of the chamber 60. In the present embodiment, rotation of the proximal chamber portion 70 causes longitudinal movement of the intermediate chamber portion 80 and the distal chamber portion 90. Since the second spiral groove 76 has a greater pitch or angle than the first spiral groove 74, the distal chamber portion 90 (which has a pin 98 disposed in the second spiral groove 76) will move a greater distance than the intermediate chamber portion 80 (which has a pin 88 disposed in the first spiral groove 74) for any given angular displacement. Accordingly, as the rotational speed of the fan increases, the chamber length (and chamber volume) and the inlet port width (and inlet port area) will both increase, and the inlet port passage length (inlet port passage volume) will decrease. These physical characteristics of the chamber have the following relationships to chamber frequency tuning: increasing chamber volume yields lower resonant frequency and less suppression bandwidth, increasing inlet port area yields higher resonant frequency and greater suppression bandwidth, and decreasing inlet port passage length (volume) yields higher resonant frequency and greater suppression bandwidth.

It should be recognized that other types of supports, bearings, arms, and pins, or additional struts, bearings, arms, and pins may be employed to encourage smooth movement of the chamber portions. Furthermore, the proximal chamber portion may include an opposing second set of grooves to accommodate each of the intermediate and distal chamber portions having a second pin on an opposing side. The first and second set of grooves may also be configured to drive the intermediate and distal chambers in opposite longitudinal directions in response to changes in fan RPM.

Figure 4:
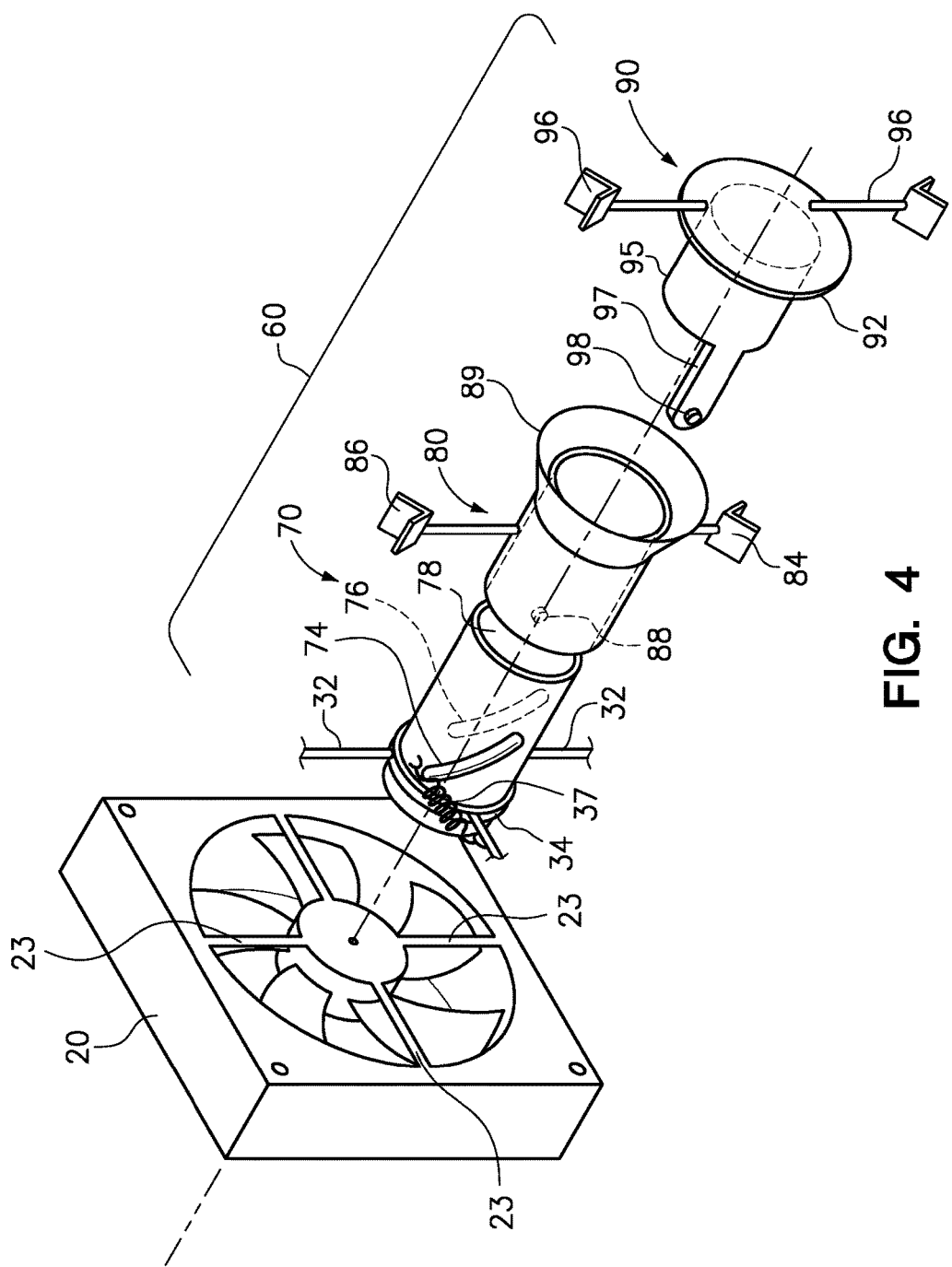
FIG. 4 is an exploded perspective view of the adjustable chamber

FIG. 4 is an exploded perspective view of the adjustable chamber 60. The perspective view of FIG. 4 is consistent with the schematic side view of FIG. 3, but shows further detail of some elements. For example, the V-shaped grooves in the slide bearings 86, 96 are more clearly shown. The first spiral groove 74 is shown cut into the outer surface of the proximal chamber portion 70. Still further, the rotational bearing 34 is shown extending around the proximal chamber portion 70, and the pin 98 is more clearly outwardly extending. The proximal chamber portion 70 is shown with a distal end 78 that is open, and the intermediate chamber portion 80 is shown with a flared distal end 89 that cooperates with the end cap 92 to form an inlet port there between. If no extension flange 95 has been added to distal end cap 92, the distance between the inner and outer diameters of this flare forms the port passage length, determining the port passage volume.

A spring 37 establishes a default angular position of the proximal chamber portion 70. This spring can extend between one of the struts 32 and a surface of the proximal chamber portion 70 or the spring can be coiled around the exterior of the proximal chamber portion 70 and attached to fixed bearing 34. The default angular position is where the proximal chamber portion 70 will be positioned when the fan 20 is either off or at such a slow speed that the eddy currents in the metal pickup 72 are too weak to overcome the spring force of the spring 37 and begin to rotate. Whenever the fan 20 is turned off, or its rotational speed is sufficiently reduced, the spring 37 will return the proximal chamber portion 70 to the default angular position and, in the process, return the intermediate and distal chamber portions 80, 90 to corresponding default positions.

When fully assembled, the intermediate chamber portion 80 will slide longitudinally, on its seal, along the outer surface of the proximal chamber portion 70 and the pin 88 will be received within the first spiral groove 74. Furthermore, the arm 97 of the distal chamber portion 90 is extended through the intermediate chamber portion 80 and into the interior of the proximal chamber portion 70 so that the pin 98 is received in the second spiral groove 76.

Figure 5:
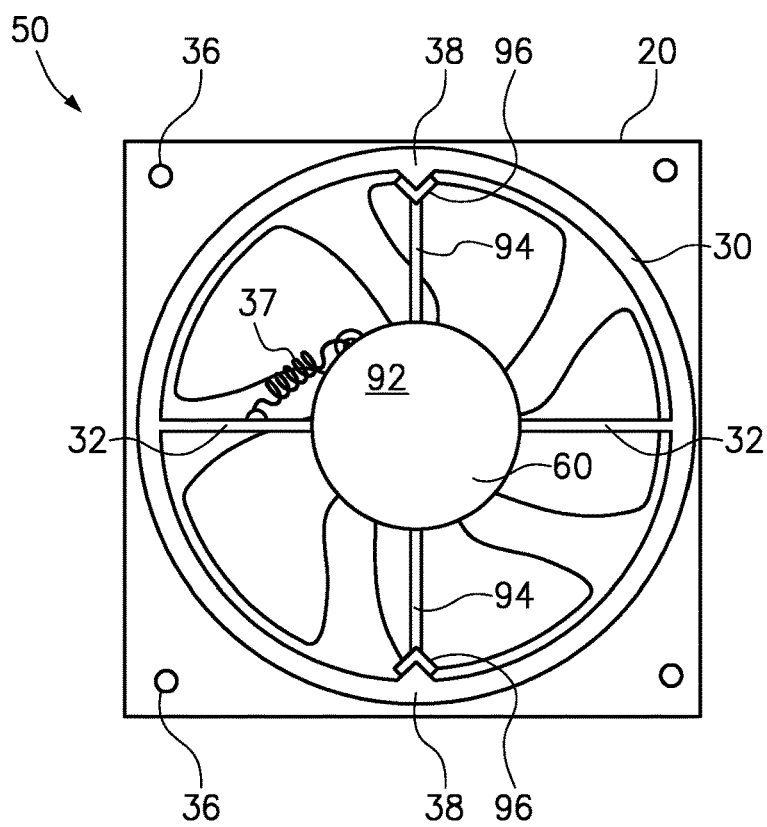
FIG. 5 is an end view of the fan assembly.

FIG. 5 is an end view of the fan assembly 50, as viewed from the right hand side of FIG. 3. The fan duct 30 is secured to the fan outlet side of the fan 20 and the chamber 60 is secured in axial alignment with the fan hub (not shown). In this view, only the end cap 92 of the distal chamber portion 90 is visible. However, the radial struts 94 and V-shaped slide bearings 96 are shown, with the V-shaped slide bearings 96 slidably engaging V-shaped channels 38 formed on the inside surface of the fan duct 30. In this view, the annular passage for airflow is shown to be substantially unimpeded.

Figure 6A:
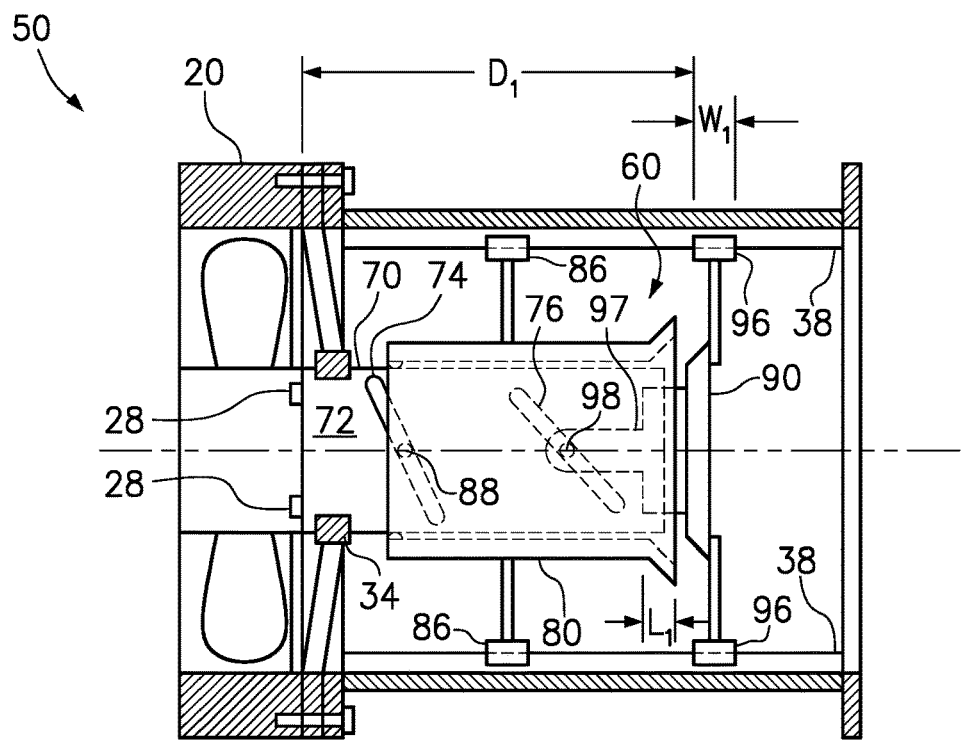
FIGS. 6A and 6B are schematic diagrams of the fan assembly with the adjustable chamber in a first position responsive to a first rotational speed of the fan and in a second position responsive to a second rotational speed of the fan.
Figure 6B:
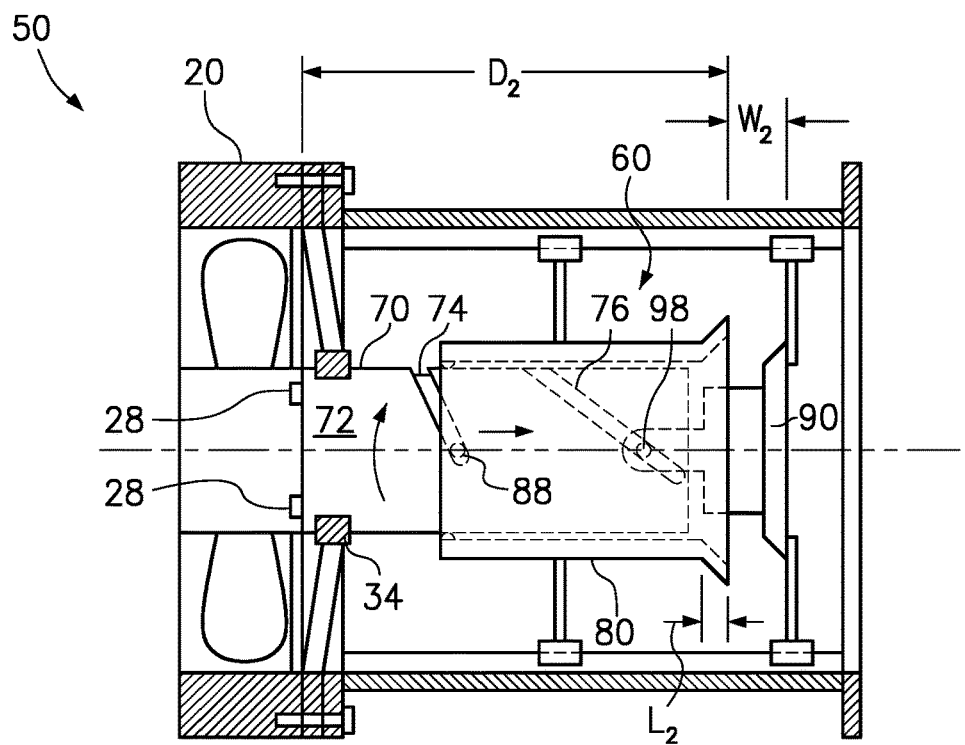

FIGS. 6A and 6B are schematic diagrams of the fan assembly 50 with the adjustable chamber 60 in a first position responsive to a first rotational speed of the fan 20 and in a second position responsive to a second rotational speed of the fan 20, respectively. In FIG. 6A, the fan 20 rotates at the first rotational speed, such that the magnets 28 (or the fan motor itself) induce eddy currents in the metal pickup 72 and cause the metal pickup 72 and proximal chamber portion 70 to rotate a first angular amount (for example, 30 degrees relative to the default position) within the bearing 34. As a result of this rotation, the first spiral groove 74 pushes on the pin 88 to cause the intermediate chamber portion 80 to move longitudinally (to the right in FIG. 6A). Accordingly, the length of the chamber increases to length $D_1$. A further result of the proximal chamber portion 70 rotating is that the second spiral groove 76 pushes on the pin 98 to cause the distal chamber portion 90 to move longitudinally (to the right in FIG. 6A). Since the second spiral groove 76 has a greater slope (i.e., more longitudinal travel per degree of angular displacement) than the first spiral groove 74, the distal chamber portion 90 moves longitudinally further than does the intermediate chamber portion 80. Accordingly, the width of the inlet port (i.e., the opening into the hollow cylindrical chamber 60 between the intermediate chamber portion 80 and the distal chamber portion 90) increase to width $W_1$ and the length of the inlet port passage decreases to length $L_1$. Note that the proximal chamber portion 70 rotates within the fixed bearing 34, while the intermediate chamber portion 80 and the distal chamber portion 90 move longitudinally with their respective slide bearings 86, 96 sliding along the slide channel 38.

In FIG. 6B, the fan 20 rotates at a second rotational speed (greater than the first rotational speed), such that the magnets 28 (or the fan motor itself) induce eddy currents in the metal pickup 72 and cause the metal pickup 72 and proximal chamber portion 70 to rotate a second angular amount (for example, 60 degrees relative to the default position) within the bearing 34. As a result of this rotation, the first spiral groove 74 pushes on the pin 88 to cause the intermediate chamber portion 80 to move longitudinally (to the right in FIG. 6B). Accordingly, the length of the chamber increases to length $D_2$. A further result of the proximal chamber portion 70 rotating is that the second spiral groove 76 pushes on the pin 98 to cause the distal chamber portion 90 to move longitudinally (to the right in FIG. 6A). Since the second spiral groove 76 has a greater slope (i.e., more longitudinal travel per degree of angular displacement) than the first spiral groove 74, the distal chamber portion 90 moves longitudinally further than does the intermediate chamber portion 80. Accordingly, the width of the inlet port (i.e., the opening into the hollow cylindrical chamber 60 between the intermediate chamber portion 80 and the distal chamber portion 90) increase to width $W_2$ and the length of the inlet port passage decreases to length $L_2$. It should be noted that if the fan speed is subsequently reduced back to the first rotational speed, then the chamber 60 will return to the dimensions of FIG. 6A aided by the spring 37 (not shown; see FIGS. 4 and 5).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
    a fan having an outlet side;
    a fan duct positioned at the fan outlet side; and
    a hollow cylindrical chamber positioned within the fan duct, wherein the chamber has two closed ends, a cylindrical side wall, and an inlet port formed in the cylindrical side wall.

2. The apparatus of claim 1, wherein the inlet port is adjacent to a distal end of the chamber.

3. The apparatus of claim 1, wherein the inlet port of the chamber is formed by a series of open slots or an open ring.

4. The apparatus of claim 1, wherein one or more dimension of the chamber is varied in response to a change in fan rotational speed.

5. The apparatus of claim 4, wherein the one or more dimension of the chamber is varied to an extent that is predetermined to cause suppression of a rotational speed-dependent noise frequency.

6. The apparatus of claim 5, wherein the inlet port has a width that is varied in response to the change in fan rotational speed.

7. The apparatus of claim 1, wherein the fan is a variable speed fan.

8. The apparatus of claim 1, wherein the fan is an axial fan having a fan hub, and wherein the cylindrical chamber is axially aligned with the fan hub.

9. The apparatus of claim 8, wherein the cylindrical chamber has an outer diameter matching a diameter of the fan hub.

10. The apparatus of claim 8, further comprising:
    a metal pickup formed at a proximal end of the chamber; and
    one or more magnets secured to the fan hub adjacent the metal pickup, wherein the rotation of the fan hub causes the magnets to induce angular displacement of the metal pickup about an axis of the fan.

11. The apparatus of claim 10, wherein the angular displacement of the metal pickup causes a variation in one or more dimension of the chamber in order to vary a noise frequency that will be suppressed.

12. The apparatus of claim 11, wherein the one or more dimension of the chamber is selected from the group consisting of chamber length, inlet port length, inlet port width and combinations thereof.

13. The apparatus of claim 10, further comprising:
    a fixed bearing that secures the metal pickup in axial alignment with the axial fan and allowing the metal pickup to rotate within the bearing.

14. The apparatus of claim 13, further comprising:
    a spring biasing the metal pickup to a default angular orientation.

15. The apparatus of claim 10, wherein the chamber includes a proximal chamber portion and a distal chamber portion;
    wherein the proximal chamber portion is coupled to the metal pickup, supported by a fixed bearing that allows the proximal chamber portion to rotate in place while maintaining axial alignment with the axial fan, and includes a spiral groove; and
    wherein the distal chamber portion is concentric with the proximal chamber portion and includes a pin received in the spiral groove of the proximal chamber portion such that rotation of the proximal chamber portion causes longitudinal movement of the distal chamber portion relative to the proximal chamber portion.

16. The apparatus of claim 15, wherein the chamber further includes an intermediate chamber portion including a pin received in a second spiral groove of the proximal chamber such that rotation of the proximal chamber portion further causes longitudinal movement of the intermediate chamber portion relative to the proximal chamber portion.

17. The apparatus of claim 16, further comprising:
a seal disposed between the proximal and intermediate chamber portions to form an air-tight seal while allowing the chamber portions to move longitudinally relative to each other.

18. The apparatus of claim 17, wherein rotation of the proximal chamber portion in a first direction causes longitudinal movement of the intermediate chamber portion to extend a length of the chamber and causes longitudinal movement of the distal chamber portion to increase a width of the inlet port and decrease the inlet port passage length.

19. The apparatus of claim 18, wherein the slopes of the first and second spiral grooves are independently selected to cause longitudinal movement of the distal and intermediate chamber portions at rates determined to suppress a rotational speed-dependent noise frequency.

20. A method comprising:
automatically adjusting one or more dimensions of a Helmholtz chamber disposed in an outlet duct of an axial fan to suppress a noise frequency that is a function of a rotational speed of the axial fan, wherein eddy currents induced by rotation of the axial fan are used to drive the adjustments in the one or more dimensions of the Helmholtz chamber as a function of the rotational speed of the axial fan.

21. The method of claim 20, wherein the one or more dimension of the Helmholtz chamber is selected from the group consisting of a length of the chamber, a length of an inlet port to the chamber, a width of an inlet port to the chamber, and combinations thereof.

22. An apparatus, comprising:
a fan having an outlet side;
a fan duct positioned at the fan outlet side; and
a hollow cylindrical chamber positioned within the fan duct, wherein the chamber has two closed ends, a cylindrical side wall, and an inlet port, wherein one or more dimension of the chamber is varied in response to a change in fan rotational speed.

* * * * *